(12) United States Patent
Pawar et al.

(10) Patent No.: US 10,004,021 B2
(45) Date of Patent: Jun. 19, 2018

(54) SYSTEM AND METHOD FOR PROVIDING SERVICES TO A USER EQUIPMENT IN AN INTER-NATIONAL LOCATION

(71) Applicant: RELIANCE JIO INFOCOMM LIMITED, Mumbai (IN)

(72) Inventors: Anil Pawar, Navi Mumbai (IN); Sagar Mishra, Navi Mumbai (IN); Gautam Reddy, Plano, TX (US); Pallavur Sankaranaraynan, Mumbai (IN)

(73) Assignee: RELIANCE JIO INFOCOMM LIMITED, Mumbai, Maharashtra (IN)

( * ) Notice: Subject to any disclaimer, the term of this patent is extended or adjusted under 35 U.S.C. 154(b) by 0 days. days.

(21) Appl. No.: 15/726,037

(22) Filed: Oct. 5, 2017

(65) Prior Publication Data
US 2018/0103409 A1    Apr. 12, 2018

(30) Foreign Application Priority Data

Oct. 6, 2016  (IN) .............................. 201621034341

(51) Int. Cl.
| | |
|---|---|
| H04W 36/36 | (2009.01) |
| H04L 29/06 | (2006.01) |
| H04W 4/02 | (2018.01) |
| H04W 36/32 | (2009.01) |

(Continued)

(52) U.S. Cl.
CPC ......... *H04W 36/36* (2013.01); *H04L 61/1511* (2013.01); *H04L 61/1529* (2013.01); *H04L 63/0236* (2013.01); *H04W 4/025* (2013.01); *H04W 36/08* (2013.01); *H04W 36/32* (2013.01)

(58) Field of Classification Search
CPC . H04L 61/1511; H04L 67/18; H04L 63/0272; H04L 12/5692; H04L 29/12301; H04L 45/745; H04L 61/2514; H04L 29/12028; H04L 29/12188; H04L 29/12367; H04L 29/12669; H04L 29/12905; H04L 61/2007; H04W 80/04; H04W 92/02; H04W 48/04;

(Continued)

(56) References Cited

U.S. PATENT DOCUMENTS

| | | | |
|---|---|---|---|
| 6,356,761 B1* | 3/2002 | Huttunen | ............... H04L 29/06 455/414.2 |
| 2013/0279414 A1* | 10/2013 | Damola | ........... H04L 29/12066 370/328 |

(Continued)

*Primary Examiner* — Nizar Sivji
(74) *Attorney, Agent, or Firm* — Ladas & Parry, LLP

(57) ABSTRACT

Embodiments of the present invention relate to systems and methods for one of restricting at least one service and providing one of the at least one service and a differential service to a subscriber, the method comprising steps of: receiving a connection request from a user equipment [102]; determining a location status of the subscriber, wherein the location status comprises one of an intra-national location and an inter-national location; generating one of a positive response in an event a source IP address is identified in a pre-stored list of source IP address and a negative response is in an event the source IP address is not identified in the pre-stored list of source IP address; and one of restricting the at least one service and providing one of the at least one service and the differential service to the subscriber.

12 Claims, 3 Drawing Sheets

(51) Int. Cl.
*H04L 29/12* (2006.01)
*H04W 36/08* (2009.01)

(58) Field of Classification Search
CPC ..... H04W 88/182; H04W 8/06; H04W 36/36; H04W 36/32; H04W 36/08; H04W 4/025
See application file for complete search history.

(56) References Cited

U.S. PATENT DOCUMENTS

2014/0078979 A1* 3/2014 Melia ................ H04L 29/12066
370/329
2016/0308821 A1* 10/2016 Siba .................... H04L 61/2007
2017/0332416 A1* 11/2017 Kiss .................... H04L 61/1511
2018/0007054 A1* 1/2018 Els ....................... H04L 63/101

* cited by examiner

SYSTEM AND METHOD FOR PROVIDING SERVICES TO A USER EQUIPMENT IN AN INTER-NATIONAL LOCATION

CROSS REFERENCE TO RELATED APPLICATION

This application claims the benefit of and priority to Indian Patent Application No: 201621034341 filed on Oct. 6, 2016, the disclosure of which is hereby incorporated herein by reference in its entirety.

TECHNICAL FIELD

Embodiments of the present invention generally relate to a heterogeneous wireless communication network. In particular, embodiments of the present invention relate to a system and method for one of restricting and providing a VoWiFi service to a user in an inter-national location.

BACKGROUND

In a traditional cellular deployment, suitable powered macrocells are being deployed to cover sufficiently large areas to provide cellular network. However, with the deployment of macrocells only, it generally suffers with quick capacity degradation with the increase in number of user equipment operating in the macrocells coverage areas. As a result, cellular operators are placing one or more wireless access points (i.e. small cells) to provide Wi-Fi network at multiple strategic locations points along with the macrocells deployment to serve large number of user equipment operating in that particular location/area. This kind of network is generally termed as heterogeneous network (referred hereinafter as HetNet).

In the current scenario and with the advancement in the Wi-Fi technology, almost all available user equipments with cellular capability have now Wi-Fi capability to connect with the Wi-Fi network operating in either of the unlicensed frequency bands, 2.4 GHz, or 5 GHz. For the typical HetNet, strategic locations/areas for such small cells generally include areas with high density of user equipments such as shopping malls, airports, railway/bus stations, colleges, etc. Further, these locations might include area with dead-spots or areas with macrocells having low signal strength such as indoor establishments or peripheral locations of the macro coverage area. Therefore, the usage of such HetNet provides better network coverage and provides the increased data capacity that enhance the overall user's mobile broadband experience. Moreover, these HetNets are used by the user to avail services; one such service is a voice-over Wi-Fi (referred hereinafter as VoWiFi). The VoWiFi service is a complementary technology to voice-over long term evolution that utilizes internet-protocol (IP) multimedia subsystem technology to provide a packet-based voice service that is delivered to the user via the Wi-Fi network.

Currently, for availing the VoWiFi service, the VoWiFi users access trusted Wi-Fi access points or an untrusted Wi-Fi access points. The trusted Wi-Fi access points are assumed to be an operator-built Wi-Fi access implementing encryption and using a secure authentication method. On the other hand, the untrusted Wi-Fi access points are considered to be an open and unsecured network as the cellular operators has no control over such access points. The untrusted Wi-Fi access points includes public hotspots, user's home Wi-Fi, a corporate Wi-Fi and any Wi-Fi access that does not provide sufficient security mechanisms such as authentication and encryption. Further, the cellular operators are attempting for a green field deployment of the VoWiFi service in order to enable the VoWiFi users to avail the VoWiFi service seamlessly over the untrusted Wi-Fi access points. Simultaneously, the telecom operators are also attempting to provide the VoWiFi service to the VoWiFi users locally as well as globally for an intra-circle, an inter-circle, and an inter-national roaming.

However, the telecom operators have an obligation of identifying a location of a VoWiFi user to determine whether the VoWiFi user is registering with the VoWiFi service within a country or outside the country in order to apply an inter-national roaming regulation for the VoWiFi service. Further, it is difficult for the telecom operators to restrict the VoWiFi user, present in any location of the inter-national roaming, based on only knowledge of a public internet protocol (IP) and a port location of a user equipment associated with the VoWiFi user. Moreover, it is difficult for the telecom operators to restrict VoWiFi inter-national roaming only to the VoWiFi users having privileges to use such service for the inter-national roaming but also not allowing all users to use the VoWiFi service. In addition to this, another challenge for the telecom operators is to charge the users differentially when the VoWiFi user is using VoWiFi services as a premium service from inter-national locations. The telecom operators also face challenge to monitor international call/data traffic separately for lawful interception when the VoWiFi user using the VoWiFi service from the inter-national locations.

Therefore, in view of the above shortcomings in the existing approaches, there is a need for efficiently and effectively identifying the location of the VoWiFi user to determine whether the VoWiFi user is registering with the VoWiFi service within the country or outside the country in order to apply the inter-national roaming regulation on the VoWiFi service and providing a real-time locations/status in the HetNet to allow/restrict the VoWiFi user in the international locations.

SUMMARY

This section is provided to introduce certain aspects of the present invention in a simplified form that are further described below in the detailed description. This summary is not intended to identify the key features or the scope of the claimed subject matter.

Embodiments of the present invention may relate to a method for one of restricting at least one service and providing one of the at least one service and a differential service to a subscriber, wherein the subscriber is associated with a unique SIM identifier of a subscriber identity module, the method comprising steps of: receiving a connection request from a user equipment, wherein the connection request includes a source IP address of the user equipment, a DNS IP address of the subscriber, and the unique SIM identifier; determining a location status of the subscriber based on a comparison of the DNS IP address with a pre-defined list of DNS IP address, wherein the location status comprises one of an intra-national location and an inter-national location; generating one of a positive response and a negative response based on a comparison of the source IP address with a pre-stored list of source IP address, wherein the positive response is generated in an event the source IP address is identified in the pre-stored list of source IP address, and the negative response is generated in an event the source IP address is not identified in the pre-stored list of source IP address; one of restricting the at least one service and providing one of the at least one service and the differential service to the subscriber, wherein the at least one service is restricted in an event of, the generation of the negative response and the determination of the intra-national location, the at least one service is provided in an event of, the generation of the positive response and the determination of the intra-national location, and the differential service is provided in an event of, the generation of the negative response and the determination of the inter-national location.

Embodiments of the present invention may relate to a network entity for one of restricting at least one service and providing one of the at least one service and a differential service to a subscriber, wherein the subscriber is associated with a unique SIM identifier of a subscriber identity module, the network entity comprising: an authoritative DNS server configured to: maintain a predefined list of DNS IP address, receive a connection request from a user equipment, wherein the connection request includes a source IP address of the user equipment, a DNS IP address of the subscriber, and the unique SIM identifier, identify a location status of the subscriber based on a compare of the DNS IP address with the predefined list of DNS IP address to, wherein the location status comprises one of an intra-national location and an inter-national location; a firewall configured to: maintain a predefined of source IP address; generate one of a positive response and a negative response based on a comparison of the source IP address with a pre-stored list of source IP address, wherein the positive response is generated in an event the source IP address is identified in the pre-stored list of source IP address, and the negative response is generated in an event the source IP address is not identified in the pre-stored list of source IP address; and a decision engine configured to: one of restrict the at least one service and provide one of the at least one service and the differential service to the subscriber, wherein the at least one service is restricted in an event of, the generation of the negative response and the determination of the intra-national location, the at least one service is provided in an event of, the generation of the positive response and the determination of the intra-national location, and the differential service is provided in an event of, the generation of the negative response and the determination of the inter-national location.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the invention, but the possible variants of the method and system according to the invention are illustrated herein to highlight the advantages of the invention. It will be appreciated by those skilled in the art that disclosure of such drawings includes disclosure of electrical components or circuitry commonly used to implement such components.

DETAILED DESCRIPTION

Figure 1:
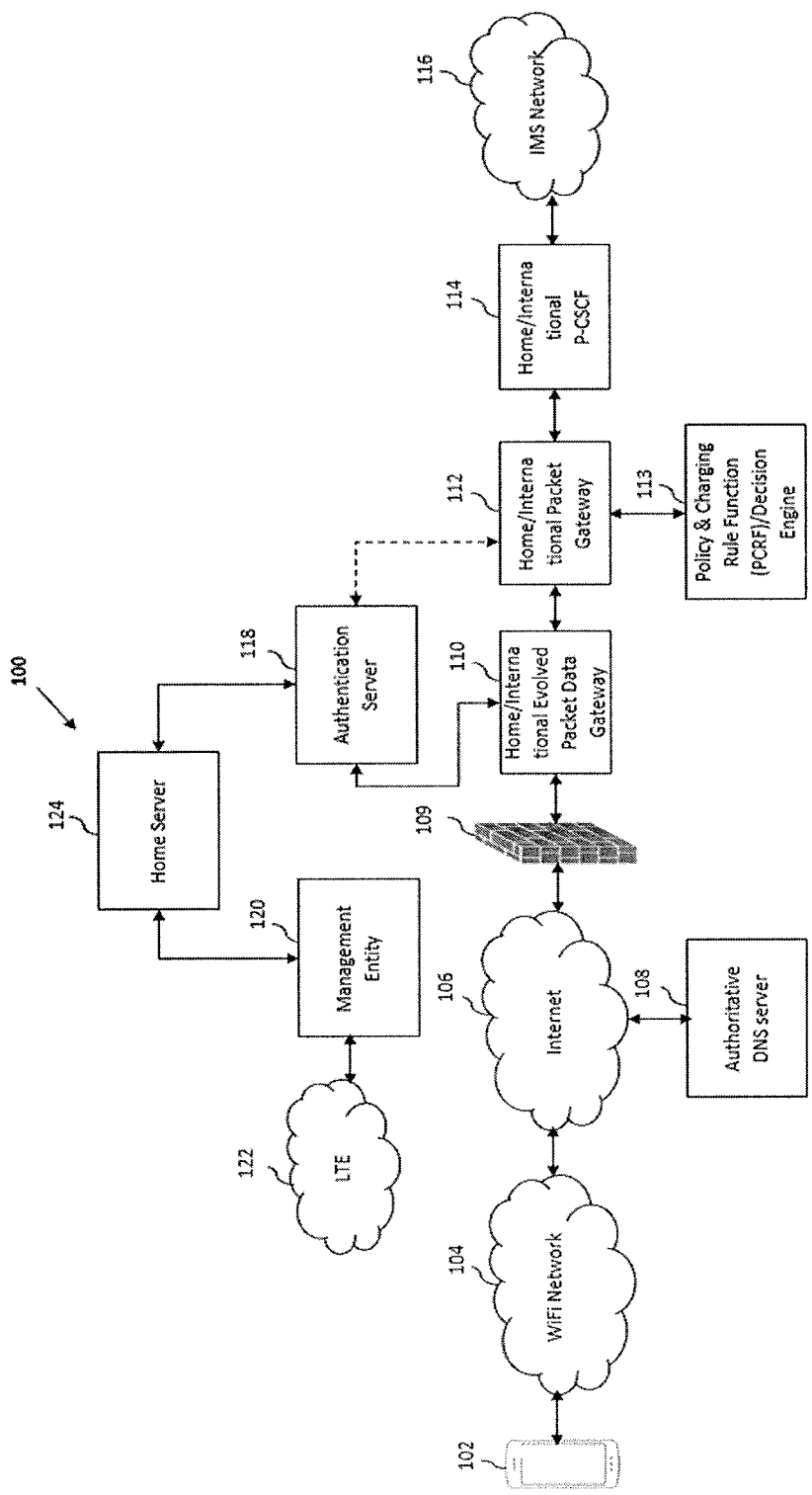
FIG. 1 illustrates a system [100] for restricting at least one service and providing one of the at least one service and a differential service to a subscriber, in accordance with an embodiment of the present disclosure.

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present invention are described below, as illustrated in various drawings in which like reference numerals refer to the same parts throughout the different drawings.

The present invention encompasses systems and methods for one of restricting at least one service and providing one of the at least one service and a differential service to a subscriber, wherein the subscriber may transmit a connection request from a user equipment to a network entity for availing the at least one service. Further, the user equipment is connected to a Wi-Fi network provided by at least one Wi-Fi access point via which the subscriber avails one of the at least one service and the differential service. One of the at least one service and the differential service are provided to the subscriber in accordance with an inter-national location and an intra-national location of the subscriber.

As used herein, the at least one service is a complementary technology to voice-over long term evolution (LTE) that utilizes internet-protocol (IP) multimedia subsystem technology to provide a packet-based voice service that is delivered to the subscriber via the Wi-Fi network. Further, the at least one service is provided to the subscriber in the intra-national location. The at least one service may include, but not limited to, voice-over Wi-Fi audio call, a voice-over Wi-Fi video call, a voice-over Wi-Fi message and a data-over Wi-Fi and any such service that is obvious to a person skilled in the art.

As used herein, the differential service is provided to the subscriber in the inter-national location and may be charged differently based on different call rates.

As used herein, the user equipment is a computing device which is connected to a cellular network using a subscriber identity module (referred hereinafter as SIM). Further, the user equipment is also capable of connecting with the Wi-Fi network provided by at least one Wi-Fi access point. The user equipment may have a processor, a display, a memory and an input means such as hard keypad and/or a soft keypad. The user equipment may include, but not limited to, a mobile phone, a tablet, a wearable device, a phablet, a personal digital assistance and any such device obvious to a person skilled in the art.

As used herein, the network entity comprises of one or more components of the cellular network. Such components include, but not limited to, a home server, a management entity, a home/international evolved packet data gateway to which the user equipment is connected, an authentication server, an authoritative DNS server, a home/international packet gateway, a firewall, a policy & charging rule function (PCRF)/a decision engine, a home/international proxy-call session control function (P-CSCF), an IP multimedia subsystem network, and a long-term evolution (LTE) network.

As used herein, the at least one Wi-Fi access point serves the Wi-Fi network to the subscriber, wherein the at least one Wi-Fi access point serves the at least subscriber using a wireless connection established between subscriber and the at least one Wi-Fi access point via the Wi-Fi network.

As used herein, the Wi-Fi network is capable of providing short-range wireless communication between the subscriber and the at least one Wi-Fi access point. Further, the Wi-Fi network is operable at a variable wireless frequency band such as 2.4 GHz and 5 GHz.

As used herein, the inter-national location of the subscriber may refer to any location of the subscriber outside a country, wherein the country of the subscriber may be identified by the SIM.

As used herein, the intra-national location of the subscriber may refer to any location of the subscriber within a country, wherein the country of the subscriber may be identified by the SIM.

As illustrated in FIG. 1, the present invention illustrates a system [100] for restricting at least one service and providing one of the at least one service and a differential service to a subscriber, in accordance with an embodiment of the present disclosure, the system [100] comprising: a user equipment [102], a Wi-Fi network [104], an internet [106], an authoritative DNS server [108], a firewall [109], a home/international evolved packet data gateway (hereinafter referred to as ePDG) [110], a home/international packet gateway (hereinafter referred to as PGW) [112], a policy & charging rule function (hereinafter referred to as PCRF)/a decision engine [113], a home/international proxy-call session control function [114] (hereinafter referred to as P-CSCF), an IP multimedia subsystem network [116] (hereinafter referred to as IMS network), an authentication server [118], a management entity [120] and a long-term evolution network [122](hereinafter referred to as LTE network), and a home server [124].

The user equipment [102] may be configured to receive the cellular network using the SIM, wherein the SIM may have a unique SIM identifier and may be present inside the user equipment [102]. The user equipment [102] may be further configured to receive the Wi-Fi network [104] through the at least one Wi-Fi access point using which the user equipment [102] avails the at least one service. Moreover, the user equipment [102] may be configured to receive the internet [106] through one of the cellular network and the Wi-Fi network [104]. The user equipment [102] may have a user equipment identifier that is used to identify the user equipment [102]. Also, the user equipment [102] may also have a source internet protocol (hereinafter referred to as IP) address for identifying a location information corresponding to the user equipment [102] and/or the subscriber. The user equipment [102] may receive the source IP address from the cellular network once the user equipment [102] is latched with the cellular network. In addition to receiving the source IP address from the cellular network, the user equipment [102] and/or the subscriber may receive a DNS IP address from the authoritative DNS server [108] when the user equipment [102] is latched with the cellular network. Similarly, the SIM may also have a unique SIM identifier that uniquely identifies the SIM. The unique SIM identifier may include, but not limited to, an inter-national/inter-national mobile subscriber identifier, a mobile station inter-national/inter-national subscriber directory number, a unique mobile identification number, and any such identifier obvious to a person skilled in the art.

When the user equipment [102] is turned on, the user equipment [102] may get latched to the cellular network and thereby, may receive the source IP address from the cellular network and the DNS IP address from the authoritative DNS server [108]. Further, the user equipment [102] may now transmit a connection request to the authoritative DNS server [108] for availing one of the at least one service and the differential service from the IMS network [116]. The connection request may include at least one of the source IP address of the user equipment [102], the unique SIM identifier, and the DNS IP address of the subscriber.

The authoritative DNS server [108] may be configured to receive the connection request from the user equipment [102] for availing one of the at least one service and the differential service from the IMS network [116]. Further, the authoritative DNS server [108] may maintain a list of pre-defined DNS IP address, wherein each of the pre-defined DNS IP address in the authoritative DNS server [108] may only belong to the intra-national location. Once the authoritative DNS server [108] receives the connection request from the user equipment [102], the authoritative DNS server [108] may identify a location status of the user equipment [102] and/or the subscriber by comparing the DNS IP address received in the connection request with the pre-defined DNS IP address in the authoritative DNS server [108]. In an event, the DNS IP address matches with the pre-defined DNS IP address, the location status of the user equipment [102] may be identified as the intra-national location. Also, in an event, the DNS IP address does not match with the pre-defined DNS IP address, the location status of the user equipment [102] may be identified as the inter-national location. The authoritative DNS server [108] may identify the location status of the user equipment [102] and/or the subscriber as one of the inter-national location and the intra-national location. For instance, based on the DNS IP address, the location status of the user equipment [102] and/or the subscriber may be identified as "India" as the intra-national location, on the other hand, the location status may be identified as "Outside India" as the inter-national location. Then, the authoritative DNS server [108] may transmit the connection request and the location status of the user equipment [102] and/or the subscriber to the firewall [109].

The firewall [109] may be configured to receive the connection request and the location status of the user equipment [102] and/or the subscriber from the authoritative DNS server [108]. The connection request includes at least one of the source IP address of the user equipment [102], the unique SIM identifier, and the DNS IP address of the subscriber. Further, the firewall [109] may maintain a list of pre-stored source IP address, wherein each of the pre-stored source IP address in the firewall [109] may only belong to the intra-national location. On receiving the connection request and the location status, the firewall [109] may compare the source IP address of the user equipment [102] with the pre-stored source IP address to generate one a positive response and a negative response. Moreover, the positive response may be generated by the firewall [109] in an event the firewall [109] identifies a match of the source IP address of the user equipment [102] with the pre-stored source IP address. Alternatively, the negative response may be generated by the firewall [109] in an event the firewall [109] does not identify a match of the source IP address of the user equipment [102] with the pre-stored source IP address. The firewall [109] may transmit one of the positive response and the negative response to the authentication server [118] through the home/international ePDG [110]. In an instance, the home ePDG [110] may be selected when the location status of the user equipment [102] is identified as intra-national location whereas the international ePDG [110] may be selected when the location status of the user equipment [102] is identified as inter-national location.

The authentication server [118] may be configured to receive the one of the positive response and the negative response from the firewall [109]. Further, the authentication server [118] may provide a P-CSCF address, through the PGW [112], to the user equipment [102] in an event the positive response is generated. The PGW [112] may be one of a home PGW [112] and an international PGW [112], wherein the user equipment [102] may be connected to the home PGW [112] when the location status corresponds to the intra-national location and the user equipment [102] may be connected to the international PGW [112] when the location status corresponds to the inter-national location. Further, the P-CSCF address may be assigned by the home PGW [112] to the user equipment [102] when the location status of the user equipment [102] subscriber corresponds to the intra-national location. Alternatively, in an event the negative response is generated, the authentication server [118] may provide an international P-CSCF IP address which further provides international P-CSCF address that may be assigned to the user equipment [102] by the international PGW [112] through the authentication server [118]. Moreover, the international P-CSCF IP address may be assigned by the international PGW [112] to the user equipment [102] when the location status of the user equipment [102] corresponds to the inter-national location. Once, the authentication server [118] assigns one of the P-CSCF address and the international P-CSCF IP address, by the PGW [112], to the user equipment [102] based on one of the positive response and the negative response, the authentication server [118] may transmit the connection request along with one of the P-CSCF address and the international P-CSCF IP address assigned to user equipment [102] to the decision engine [113].

The PCRF/decision engine [113] may be configured to receive the connection request along with one of the P-CSCF address and the international P-CSCF IP address assigned to user equipment [102]. Further, the decision engine [113] may configured to receive one of the positive response and the negative response received from the firewall [109] and the location status of the user equipment [102] from the authoritative DNS server [108]. The decision engine [113] may also be configured to restrict the at least one service is restricted in an event of the negative response received from the firewall [109] and the location status of the user equipment [102] corresponds to the intra-national location. Moreover, the decision engine [113] may be configured to provide the at least one service in an event of the positive response received from the firewall [109] and the location status of the user equipment [102] corresponds to the intra-national location. Also, the decision engine [113] may be configured to provide the differential service in an event the negative response received from the firewall [109] and the location status of the user equipment [102] corresponds to the inter-national location. Thereby, the user equipment [102] may establish the connection with the through the IMS network [116] and may avail one of the at least one service and the differential service in one of the intra-national location and the inter-national location, respectively. The PCRF/decision engine [113] may reside in at least one of the authentication server [118] and the PGW [112].

The home server [124] may be configured to maintain one or more user profiles for each subscriber of the cellular network. The user profile includes at least one of, but not limited to, the unique SIM identifier, the source IP address, the DNS IP address, a latest/last state information and a latest/last location status of the SIM. Further, in an embodiment, the home server [124] may be configured to further transmit a request to the management entity [120], wherein the request is for at least one of the latest/last state information and the latest/last location status of the SIM. In a preferred embodiment, the home server [124] may transmit the request to the management entity [120], wherein the request is an insert subscriber-data request (IDR) sent on S6a/S6d interface with evolved packet system (referred hereinafter as EPS) user state bit set containing the information related to the user state in the management entity [120] in an IDR flag. Moreover, the latest/last state information includes one of a connected state and a detached state of the user equipment, wherein the connected state corresponds that the user equipment is latched to the cellular network and the detached state corresponds that the user equipment is disconnected with the cellular network.

The management entity [120] may be configured to receive the request from the home server [124] for at least one of the latest/last state information and the latest/last location status of the SIM. In response, the management entity [120] may provide at least one of the latest/last state information and the latest/last location status of the SIM to the home server [124]. In a preferred embodiment, the response sent to the home server [124] may be insert subscriber data answer (IDA) with the EPS user state and the EPS latest/last location status. Further, the management entity [120] may be configured to communicate with the LTE network [122].

Once the home server [124] receives the at least one of the latest/last state information and the latest/last location status of the SIM from the management entity [120], the home server [124] may transmit the at least one of the latest/last state information and the latest/last location status of the SIM to the authentication server [118]. In a preferred embodiment, the home server [124] may transmit the latest/last state information and/or the latest/last location status to the authentication server [118], in the form of a user data answer (UDA) message with the EPS user state in an xml format. Based on the at least one of the user profile and the latest/last state information, the authentication server [118] may decide whether to provide or restrict the connection to avail one of the at least one service and the differential service.

Figure 2:
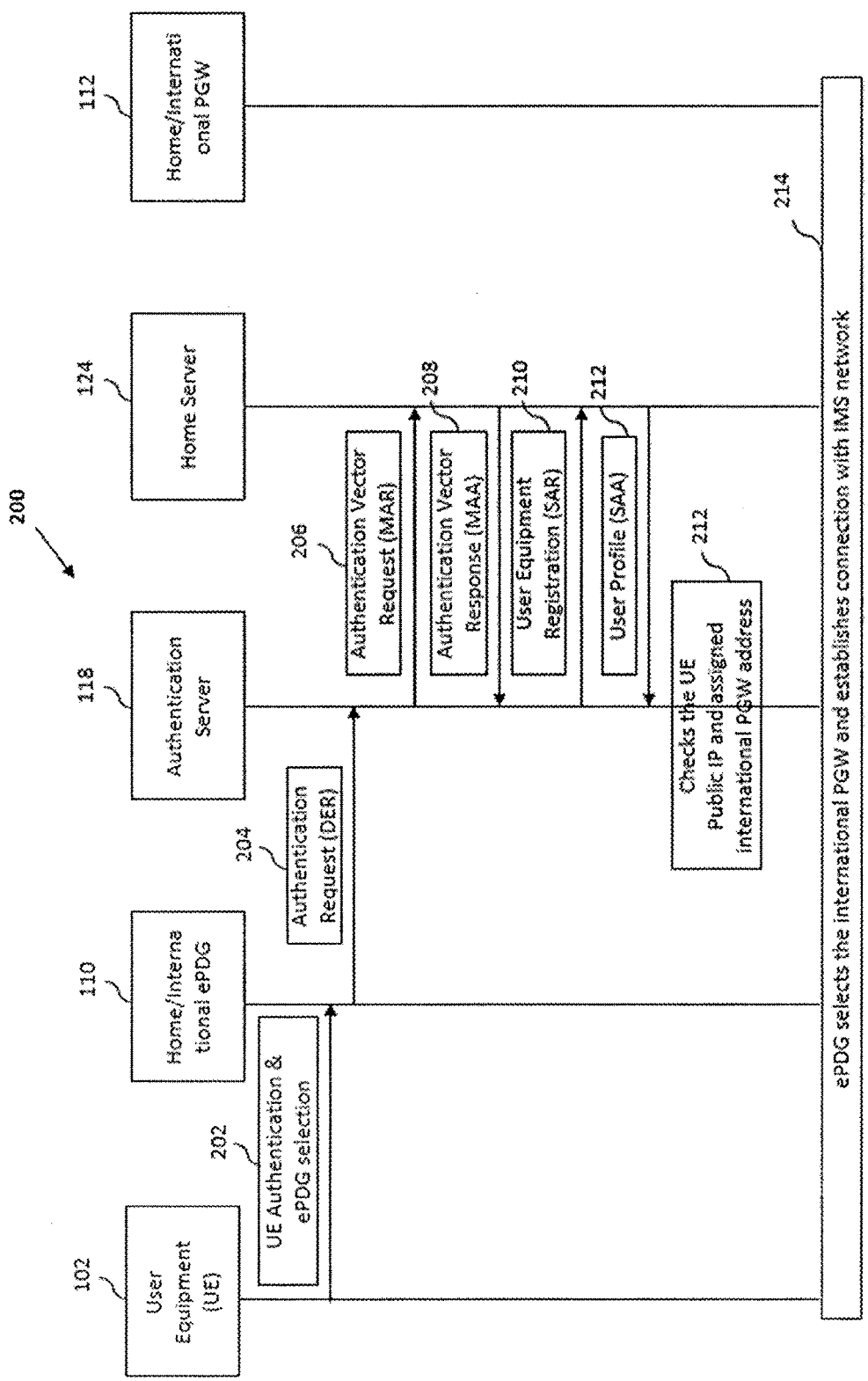
FIG. 2 illustrates an exemplary signaling flow diagram [200] for restricting at least one service and providing one of the at least one service and a differential service to a subscriber, in accordance with an embodiment of the present disclosure.

FIG. 2 illustrates an exemplary signaling flow diagram [200] for restricting at least one service and providing one of the at least one service and a differential service to a subscriber, in accordance with an embodiment of the present disclosure.

At step 202, the user equipment [102] may select one of the home ePDG [110] and the international ePDG [110]. The user equipment [102] may select the home ePDG [110] in an event the location status of the user equipment [102] corresponds to the intra-national location. Similarly, the user equipment [102] may select international ePDG [110] in an event the location status of the user equipment [102] corresponds to the inter-national location. This selection of one of the home ePDG [110] and the international ePDG [110] may be resolved by the authoritative DNS server [108] based on the at least one of the source IP address, the DNS IP address and the SIM identifier. Further, user equipment [102] may transmit the connection request to the selected ePDG including at least one of the source IP address, the DNS IP address and the SIM identifier.

At step 204, after the user equipment [102] may select one of the home ePDG [110] and the international ePDG [110] based on the location status, the selected ePDG may send a diameter EAP request (DER) to the authentication server [202] for authentication and authorization of the user equipment [102].

At step 206, the authentication server [202] may further sends transmits a multimedia-auth-request (MAR) to the home server [124] over an SWx interface.

At step 208, the home server [124] may generate authentication vectors based on the connection request and in response, the home server [124] may send a multimedia-auth-answer (MAA) to the authentication server [202].

At step 210, the authentication server [202] may update the home server [124] with the registration of the user equipment [102] address information using a server-assignment-request (SAR).

At step 212, the home server [124] may send server-assignment-answer (SAA) to the authentication server [202] for the user profile download for the user equipment [102].

At step 214, the authentication server [202] may check at least one of the source IP address and the DNS IP address of the user equipment [102] with the pre-defined DNS IP address and the pre-stored source IP address. In an event, the source IP address of the user equipment [102] matches with the pre-stored source IP address, the P-CSCF address may be provided to the user equipment [102], alternatively, the international P-CSCF address may be assigned to the user equipment [102]. Further, the P-CSCF address may be assigned based on the intra-national location status of the user equipment [102] and the international P-CSCF address may be assigned based on the inter-national location status of the user equipment [102].

At step 218, the decision engine [113] may enable the user equipment [102] to establish a connection with the IMS network [116] to avail one of the at least one service based on the intra-national location status of the user equipment [102] and the differential service based on the inter-national location status of the user equipment [102]. Further, the at least one service may be restricted to the user equipment [102] in the intra-national location. Further, the decision engine [113] may restrict or provide one of the at least one service and the differential service based on the profile information related to the subscriber.

Figure 3:
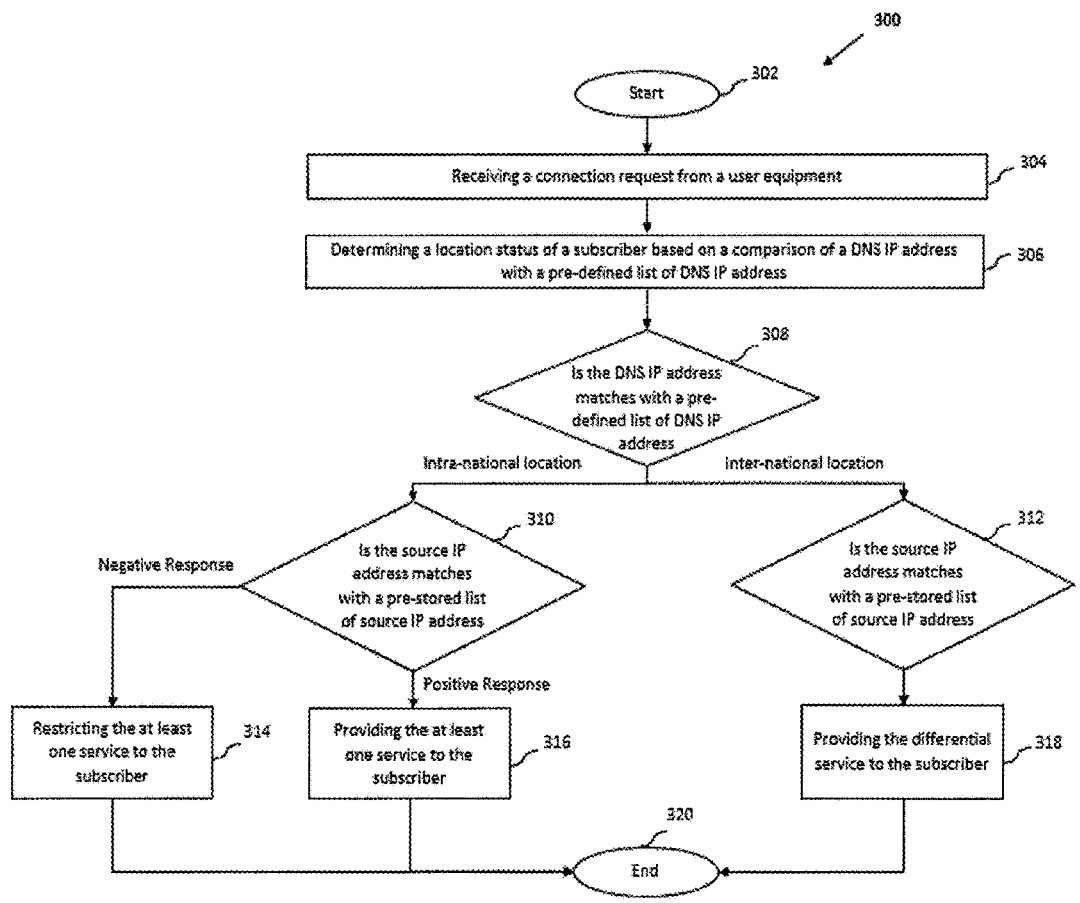
FIG. 3 illustrates an exemplary method flow diagram [300] for restricting at least one service and providing one of the at least one service and a differential service to a subscriber, in accordance with an embodiment of the present invention.

As illustrated in FIG. 3, the present invention illustrates an exemplary method flow diagram [300] for restricting at least one service and providing one of the at least one service and a differential service to a subscriber, in accordance with an embodiment of the present invention. The method [300] may be performed by the network entity and initiates at step 302.

At step 304, the network entity may receive a connection request from the user equipment [102] for availing the at least one service from the IMS network [116]. The connection request may include at least one of the source IP address of the user equipment [102], the unique SIM identifier, and the DNS IP address of the subscriber. Further, when the user equipment [102] is turned on, the user equipment [102] may get latched to the cellular network and thereby, may receive the source IP address from the cellular network and the DNS IP address from the authoritative DNS server [108].

At step 306, the network entity may maintain a list of pre-defined DNS IP address, wherein each of the pre-defined DNS IP address in the authoritative DNS server [108] may only belong to the intra-national location. Once the authoritative DNS server [108] receives the connection request from the user equipment [102], the network entity may identify a location status of the user equipment [102] and/or the subscriber based on the DNS IP address received in the connection request. The network entity may identify a location status of the user equipment [102] and/or the subscriber by comparing the DNS IP address received in the connection request with the pre-defined DNS IP address in the authoritative DNS server [108]. For instance, based on the DNS IP address, the location status of the user equipment [102] and/or the subscriber may be identified as "India" as the intra-national location, on the other hand, the location status may be identified as "Outside India" as the inter-national location.

At step 308, the network entity may compare the DNS IP address received in the connection request with the pre-defined DNS IP address in the authoritative DNS server [108]. The network entity may identify a match of the DNS IP address with the pre-defined DNS IP address and thus, may identify the location status of the user equipment [102] as the intra-national location. Also, in an event, the DNS IP address may not match with the pre-defined DNS IP address, then the network entity may identify the location status of the user equipment [102] as the inter-national location. When the location status corresponds to the inter-national location, the method [300] may move at step 312 and the when the location status corresponds to the intra-national location, the method [300] may move at step 310.

At step 310, the network entity may maintain a list of pre-stored source IP address, wherein each of the pre-stored source IP address in the firewall [109] may only belong to the intra-national location. On receiving the connection request and the location status, the network entity may compare the source IP address of the user equipment [102] with the pre-stored source IP address to generate one a positive response and a negative response. Moreover, the positive response may be generated by the firewall [109] in an event the firewall [109] identifies a match of the source IP address of the user equipment [102] with the pre-stored source IP address. Alternatively, the negative response may be generated by the firewall [109] in an event the firewall [109] does not identify a match of the source IP address of the user equipment [102] with the pre-stored source IP address. The firewall [109] may transmit one of the positive response and the negative response to the authentication server [118] through the home/international ePDG [110]. The network entity may be configured to receive the one of the positive response and the negative response from the firewall [109]. Further, the network entity may provide a P-CSCF address to the user equipment [102] in an event the positive response is generated. Further, the P-CSCF address may be assigned by the home PGW [112] to the user equipment [102] when the location status of the user equipment [102] subscriber corresponds to the intra-national location. In case of the positive response, the method [300] may move to 316, and in case of the negative response, the method [300] may move to 314.

At step 312, the network entity may the network entity may maintain a list of pre-stored source IP address, wherein each of the pre-stored source IP address in the firewall [109] may only belong to the inter-national location. On receiving the connection request and the location status, the network entity may compare the source IP address of the user equipment [102] with the pre-stored source IP address. The network entity may receive one of the positive response and the negative response from the firewall [109]. In an event the negative response is generated, the network entity may provide the international P-CSCF IP address that may be assigned to the user equipment [102] by the international PGW [112] through the authentication server [118]. Moreover, the international P-CSCF IP address may be assigned by the international PGW [112] to the user equipment [102] when the location status of the user equipment [102] corresponds to the inter-national location.

At step 314, the network entity may receive one of the positive response and the negative response received from the firewall [109] and the location status of the user equipment [102] from the authoritative DNS server [108]. The network entity may restrict the at least one service in an event of the negative response received from the firewall [109] and the location status of the user equipment [102] corresponds to the intra-national location.

At step 316, the network entity may provide the at least one service in an event of the positive response received from the firewall [109] and the location status of the user equipment [102] corresponds to the intra-national location.

At step 318, Also, the decision engine [113] may provide the differential service in an event the negative response received from the firewall [109] and the location status of the user equipment [102] corresponds to the inter-national location. Thereby, the user equipment [102] may establish the connection with the through the IMS network [116] and may avail one of the at least one service and the differential service in one of the intra-national location and the international location, respectively. Then, the method [300] may end at step 320.

The present invention encompasses a SWu interface for the user equipment [102] to communicate with the home/international ePDG [110]. The SWu interface is a secure interface to the user equipment [102] in the untrusted Wi-Fi access points. Such interface may carry IPSec tunnels.

Further, the IKEv2 protocol may be used to establish the IPSec tunnels between the user equipment [102] and the home/international ePDG [110].

The present invention further encompasses a SWm interface for the home/international ePDG [110] to communicate with the authentication server [118] using this interface. The SWm is the interface that may be used transport mobility parameters of the user equipment [102] and tunnel authentication and authorization data using EAP-AKA method.

The present invention also encompasses a SWx interface for enabling the communication between the authentication server [118] and the home server [124] and may be used to transport mobility parameters of the user equipment [102] and fetch User authorization data from the home server [124].

The present invention also encompasses a s2b interface that connects the home/international ePDG [110] with the home/international PGW [112] and may be based on GTPv2 10 protocol and used to establish sessions for the user equipment [102].

The present invention encompasses a s6b interface for connecting the home/international PGW [112] with the IMS network [116] and may be used to update the home/international P-CSCF address to the home server [124] when the user equipment [102] is attached on the untrusted Wi-Fi access points.

The present invention facilitates the management entity [120] to maintain the latest/last state information of the subscriber based on the connection of the user equipment [102] with the cellular network. The exemplary Table 1 defines some conditions for which state of the user equipment [102] is defined. For an instance, when the user equipment [102] is accessing internet [106] or when the user equipment [102] is in an idle state, the state of the user equipment [102] is connected i.e. the user equipment [102] is connected to the cellular network. However, in the condition of "after purge timer start and before expiry", the state of the user equipment [102] is detached i.e. the user equipment [102] is currently disconnected to the cellular network.

TABLE 1

| S. No. | Condition | IDR-Flags | EPS-User State |
|---|---|---|---|
| 1 | The subscriber is enjoying internet | EPS user state request, EPS location information request | CONNECTED_REACHABLE_FOR PAGING |
| | | EPS user state request, EPS location information request, current location request | CONNECTED_REACHABLE_FOR PAGING |
| 2 | The subscriber is in idle | EPS user state request, EPS location information request | CONNECTED_REACHABLE_FOR PAGING |
| | | EPS user state request, EPS location information request, current location request | CONNECTED_REACHABLE_FOR PAGING |
| 3 | After MRT timer start & before IDT timer start | EPS user state request, EPS location information request | CONNECTED_REACHABLE_FOR PAGING |
| | | EPS user state request, EPS location information request, current location request | CONNECTED_REACHABLE_FOR PAGING |

TABLE 1-continued

| S. No. | Condition | IDR-Flags | EPS-User State |
|---|---|---|---|
| 4 | After IDT timer start & before purge timer start | EPS user state request, EPS location information request | NETWORK_DETERMINED_NOT REACHABLE |
|  |  | EPS user state request, EPS location information request, current location request | NETWORK_DETERMINED_NOT REACHABLE |
| 5 | After purge timer start and before expiry | EPS user state request, EPS location information request | DETACHED |
|  |  | EPS user state request, EPS location information request, current location request | DETACHED |
| 6 | After purge timer expiry | EPS user state request, EPS location information request | ERROR_USER_UNKNOWN |

As used herein, the authoritative DNS server [108] may be a domain name server [DNS] used for resolving the IP address of the user equipment [102] and helps in identifying the home/international evolved packet data gateway [110].

As used herein, the home/international ePDG [110] may be a carrier-grade gateway to offer VoWiFi secure service for the subscriber/s over trusted and untrusted Wi-Fi access points present in the HetNet.

As used herein, the home/international PGW [112] may be a home/international packet gateway that may be critical network function for the LTE network [122]. The PGW [112] acts as the interface between the LTE network [122] and other packet data networks, such as the Internet [106] or SIP-based IMS networks [116]. Further, the packet gateway [112] serves as the anchor point for the network mobility.

As used herein, the home/international P-CSCF [114] may be a Proxy-CSCF that may be a SIP proxy that is the first point of contact for the IMS network [116].

As used herein, the IMS network [116] may refer to a network offering multimedia services to the subscriber over the LTE network. Such multimedia services include VoWiFi services.

As used herein, the authentication server [118] may be a carrier-grade server to authenticate & authorize the subscribers as a part of data offload & trusted VoWiFi services offering.

As used herein, the management entity [120] may refer to the key control-node for the LTE network [122] and may be responsible for idle mode for the user equipment [102] performing paging and tagging procedure including retransmission.

As used herein, the LTE network [122] may refer to a fourth generation (4G) of the cellular network that provides wireless communication at a high speed.

As used herein, the home server [124] may be a master user database that supports the IMS network [116] entities that actually handle calls. Further, the home server [124] may contain the subscription-related information (subscriber/user profiles), performs authentication and authorization of the subscriber.

As used herein, the PCRF/decision engine [113] may refer to a software node designated in real-time to determine policy rules in the IMS network [116]. The PCRF/decision engine [113] may also reside in the authentication server [118].

As used herein, the MRT timer refers to a mobile reachable timer (MRT) that starts after the state of the user equipment [102] changes from the connected state to an idle state. Further, after the MRT expires, the IDT timer starts.

As used herein, the IDT timer refers to an implicit detach timer (IDT) and after the expiry of the IDT, the user equipment [102] may be considered detached or disconnected from the cellular network.

As used herein, the purge timer refers to a time after the IDT expires and then the purge timer starts for deleting the subscriber from the management entity [120].

The interface, module, and component depicted in the figures and described herein may be present in the form of a hardware, a software and a combination thereof. Connection shown between these components/module/interface in the system [100] are exemplary and any components/module/interface in the system [100] may interact with each other through various logical links and/or physical links. Further, the components/module/interface may be connected in other possible ways.

Though a limited number of the user equipment [102], the Wi-Fi network [104], the internet [106], the authoritative DNS server [108], the firewall [109], the home/international ePDG [110], the home/international PGW [112], the home/international P-CSCF [114], the IMS network [116], the authentication server [118], the management entity [120] and the LTE network [122], the home server [124], interfaces, modules and components, have been shown in the figures; however, it will be appreciated by those skilled in the art that the overall system [100] of the present invention encompasses any number and varied types of the entities/elements such the user equipment [102], the Wi-Fi network [104], the internet [106], the authoritative DNS server [108], the firewall [109], the home/international ePDG [110], the home/international PGW [112], the home/international P-CSCF [114], the IMS network [116], the authentication server [118], the management entity [120] and the LTE network [122], the home server [124], interfaces, modules and components.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method for one of restricting at least one service and providing one of the at least one service and a differential service to a subscriber including a user profile, wherein the subscriber is associated with a unique subscriber identity module (SIM) identifier of a subscriber identity module, the method comprising steps of:
   receiving a connection request from a user equipment, wherein
   the connection request includes a source internet protocol (IP) address of the user equipment, a domain name server (DNS) IP address of the subscriber, and the unique SIM identifier;
   determining a location status of the subscriber based on a comparison of the DNS IP address with a predefined list of DNS IP address, wherein the location status comprises one of an intra-national location and an inter-national location;
   generating one of a positive response and a negative response based on a comparison of the source IP address with a pre-stored list of source IP address, wherein
   the positive response is generated in an event the source IP address is identified in the pre-stored list of source IP address, and
   the negative response is generated in an event the source IP address is not identified in the pre-stored list of source IP address;
   one of restricting the at least one service and providing one of the at least one service and the differential service to the subscriber, wherein
   the at least one service is restricted in an event of, the generation of the negative response and the determination of the intra-national location,
   the at least one service is provided in an event of, the generation of the positive response and the determination of the intra-national location, and
   the differential service is provided in an event of, the generation of the negative response and the determination of the inter-national location.

2. The method as claimed in claim 1, further comprising providing one of the at least one service and the differential service to the subscriber in an event the subscriber is latched with a cellular network.

3. The method as claimed in claim 1, further comprising providing the differential service based on one of the user profile, a subscription information;
   wherein the user profile comprises at least one of: the unique SIM identifier, the source IP address, the DNS IP address, a last state information and a last location status of the SIM.

4. The method as claimed in claim 1, wherein the at least one service and the differential service comprises one of a voice-over Wi-Fi audio call, a voice-over Wi-Fi video call, a voice-over Wi-Fi message.

5. The method as claimed in claim 1, wherein the unique SIM identifier comprises one of a mobile country code, an international mobile subscriber identifier, a mobile station international subscriber directory number and a unique mobile identification number.

6. A network entity for one of restricting at least one service and providing one of the at least one service and a differential service to a subscriber including a user profile, wherein the subscriber is associated with a unique subscriber identity module (SIM) identifier of a subscriber identity module, the network entity comprising:
   an authoritative domain name server (DNS) server configured to:
   maintain a predefined list of DNS internet protocol (IP) address,
   receive a connection request from a user equipment, wherein the connection request includes a source IP address of the user equipment, a DNS IP address of the subscriber, and the unique SIM identifier,
   identify a location status of the subscriber based on a compare of the DNS IP address with the predefined list of DNS IP address to, wherein the location status comprises one of an intra-national location and an inter-national location;
   a firewall configured to:
   maintain a predefined of source IP address;
   generate one of a positive response and a negative response based on a comparison of the source IP address with a pre-stored list of source IP address, wherein the positive response is generated in an event the source IP address is identified in the pre-stored list of source IP address, and the negative response is generated in an event the source IP address is not identified in the pre-stored list of source IP address; and
   a decision engine configured to:
   one of restrict the at least one service and provide one of the at least one service and the differential service to the subscriber, wherein
   the at least one service is restricted in an event of, the generation of the negative response and the determination of the intra-national location,
   the at least one service is provided in an event of, the generation of the positive response and the determination of the intra-national location, and
   the differential service is provided in an event of, the generation of the negative response and the determination of the inter-national location.

7. The system as claimed in claim 6, further comprising an authentication server for comparing the source IP address with a pre-stored list of source IP address in an event the location status is inter-national.

8. The system as claimed in claim 6, wherein the authentication server further configured to retrieve the user profile from one of a home packet gateway and an international packet gateway;
   wherein the user profile comprises at least one of: the unique SIM identifier, the source IP address, the DNS IP address, a last state information and a last location status of the SIM.

9. The system as claimed in claim 6, wherein the decision engine is further configured to provide the differential service based on one of the user profile, and a subscription information;
   wherein the user profile comprises at least one of: the unique SIM identifier, the source IP address, the DNS IP address, a last state information and a last location status of the SIM.

10. The system as claimed in claim 6, wherein the at least one service is provided by the home packet gateway.

11. The system as claimed in claim 6, wherein the differential service is provided by a home/international packet gateway.

12. The system as claimed in claim 6, wherein the at least one service and the differential service comprises one of a voice-over Wi-Fi audio call, a voice-over Wi-Fi video call, a voice-over Wi-Fi message.

* * * * *